US007278551B2

(12) United States Patent
Graf et al.

(10) Patent No.: US 7,278,551 B2
(45) Date of Patent: Oct. 9, 2007

(54) DOSING HOPPER

(75) Inventors: Matthias Graf, Bretten (DE); Lutz Wolf, Darmstadt (DE); Guenter Natus, Muehltal (DE); Karl-Heinz Koehler, Hanau (DE)

(73) Assignee: Dieffenbacher Schenck Panel GmbH, Pfungstadt (DE)

( * ) Notice: Subject to any disclaimer, the term of this patent is extended or adjusted under 35 U.S.C. 154(b) by 581 days.

(21) Appl. No.: 10/399,352

(22) PCT Filed: Oct. 12, 2001

(86) PCT No.: PCT/EP01/11815

§ 371 (c)(1),
(2), (4) Date: Jul. 29, 2003

(87) PCT Pub. No.: WO02/30639

PCT Pub. Date: Apr. 18, 2002

(65) Prior Publication Data

US 2004/0043095 A1 Mar. 4, 2004

(30) Foreign Application Priority Data

Oct. 12, 2000 (DE) ................................ 100 50 433

(51) Int. Cl.
*G01G 11/00* (2006.01)
*G01F 11/24* (2006.01)

(52) U.S. Cl. ...................... 222/77; 222/185.1; 222/415

(58) Field of Classification Search .................. 222/64, 222/77, 185.1, 415; 198/456, 457.03, 626.1, 198/626.5; 264/112; 425/371
See application file for complete search history.

(56) References Cited

U.S. PATENT DOCUMENTS 3,280,961 A * 10/1966 McCombie ................. 198/579

(Continued)

FOREIGN PATENT DOCUMENTS

DE 1801533 5/1970

(Continued)

OTHER PUBLICATIONS

"Holzspanwerkstoffe", Franz Kollmann; Springer-Verlag, 1966, pp. 217 to 239; Berlin.

(Continued)

*Primary Examiner*—Joseph A. Kaufman
(74) *Attorney, Agent, or Firm*—W. F. Fasse; W. G. Fasse

(57) ABSTRACT

A dosing hopper for producing wood material panels has a feed device (2) that distributes the supplied material flow of glued wood particles continuously over the width of the hopper (1). The dosing hopper supplies elongated flat wood strands for producing oriented structural chip boards or panels (OSB, LSL). The feed device (2) includes a weighing device (23), with which the wood strands are distributable over the entire hopper width in a weight-dosed and oriented manner.

27 Claims, 2 Drawing Sheets

U.S. PATENT DOCUMENTS

| | | | | |
|---|---|---|---|---|
| 3,340,127 | A | 9/1967 | Buerkner | |
| 3,655,098 | A | 4/1972 | Schnitzler | |
| 3,662,711 | A * | 5/1972 | Hudson | 399/295 |
| 4,133,455 | A * | 1/1979 | Moser | 222/77 |
| 4,454,940 | A | 6/1984 | Ufermann | |
| 4,470,498 | A | 9/1984 | Lund et al. | |
| 4,636,159 | A | 1/1987 | Heller et al. | |
| 4,847,022 | A * | 7/1989 | Bold | 264/40.7 |
| 4,948,322 | A | 8/1990 | Kunstmann | |
| 5,854,426 | A | 12/1998 | Benda | |
| 6,074,193 | A | 6/2000 | Kratky et al. | |
| 2001/0017428 | A1 | 8/2001 | Klasterka | |
| 2004/0178228 | A1 * | 9/2004 | Hooper | 222/415 |

FOREIGN PATENT DOCUMENTS

| | | |
|---|---|---|
| DE | 1728468 | 12/1972 |
| DE | 1728469 | 12/1972 |
| DE | 3309744 | 10/1984 |
| DE | 3437114 | 4/1986 |
| DE | 19916447 | 10/2000 |
| DE | 19916448 | 10/2000 |
| DE | 19916462 | 10/2000 |
| FR | 2080239 | 11/1971 |
| FR | 2 298 430 | 8/1976 |
| GB | 898317 | 6/1962 |

OTHER PUBLICATIONS

"Modern Particleboard & Dry-Process Fiberboard Manufacturing"; Thomas M. Maloney, Miller Freeman Publications, Nov. 1977; pp. 478 to 506.

Henschel; U.S. Appl. No. 09/958,837, filed Oct. 12, 2001, entitled: "Forming Station" 2 sheets of drawings and pp. 1 to 12.

Henschel et al.; U.S. Appl. No. 09/958,838, filed Oct. 12, 2001, entitled: "Scattering Station for Fiber Plates" 1 sheet of drawings and pp. 1 to 12.

Wirthel; U.S. Appl. No. 09/958,776, as originally filed Oct. 12, 2001, entitled: "Forming Station", 13 sheets of drawings and pp. 1 to 42.

Deppe/Ernst "Taschenbuch der Spanplattentechnik" (Pocketbook of Chip Panel Technology), 3rd Edition 1991, pp. 255.

* cited by examiner

DOSING HOPPER

FIELD OF THE INVENTION

The invention relates to a dosing hopper with a feed device for producing wood material panels.

BACKGROUND INFORMATION

In the production of chip board panels, fiber board panels, OSB panels (oriented strand or structural board), LSL panels (laminated strand lumber) and other wood material panels, dosing hoppers are arranged ahead or upstream of the actual spreading elements. These dosing hoppers make it possible to even out a time variation of the volume of the chip, fiber or strand material flow. Simultaneously, they are to make possible a continuous supply of material to the spreading heads. For this purpose, especially a uniform distribution of the chips, fibers and strands (strands) over the entire width of the spreading heads is carried out already in the dosing hopper, and thereby a continuous material flow is delivered to the spreading heads.

In actual practice, both vertical as well as horizontal dosing hoppers are known. The vertical dosing hoppers have mostly been arranged vertically above the entire spreading width of the spreading heads, and have been filled up to a prescribed filling height with glued wood chips in a continuous or discontinuous manner. Such vertical dosing hoppers are very simply embodied, whereby the chips are moved from the top toward the bottom only by their gravity without mechanical conveying elements. Discharge rolls are arranged on the hopper floor and convey the chips to the spreading elements. The vertical hoppers have lost significance in recent years, because different densities are formed on the hopper floor depending on the fill height. This has the disadvantage, that differing discharge quantities to the spreading heads result depending on the material density on the hopper floor.

For this reason, in recent years, horizontal dosing hoppers have preferably been utilized before the spreading elements, with which a substantially constant discharge density results in the discharge of wood chips. Such a horizontal dosing hopper is known from the technical reference book by Deppe/Ernst "Taschenbuch der Spanplattentechnik" (Pocketbook of Chip Panel Technology), 3rd Edition 1991, page 255. In this context, the horizontal dosing hopper is arranged above a spreading head and is supplied or loaded with wood chips from above. For this purpose, a horizontal oscillating conveyor is arranged over the supply housing, and continuously distributes the chips over the entire spreading width. Furthermore, a reverse or return combing apparatus is additionally provided in the horizontal dosing hopper, and serves for a uniform filling height over the entire hopper width, in that the higher-lying wood chip piles are continuously combed backward contrary to the discharge direction. A floor belt is additionally arranged at the hopper floor, and conveys the uniformly high chip layer in the hopper to a discharge opening over the spreading head. Thereby, the chip layer is conveyed against rotating discharge rolls, which mill or till off the layer over the entire filling height and simultaneously convey it into a discharge opening to the spreading head, in order to be spread onto a forming belt.

If long flat wood strands (strands) for producing oriented wood chip panels (OSB or LSL) are to be intermediately stored and distributed over the width in such a horizontal dosing hopper, then intermingled and tangled balled-up snarls will be formed in the horizontal hopper, especially due to the continuous reverse or return combing of the elongated wood strands. Since, besides these tangled areas, layers in which the wood strands lie loosely on top of one another are also present in the hopper, a differing or varying layering pattern arises in the hopper. These differing or varying layering patterns or material areas, however, also comprise very different or varying discharge characteristics, which leads to a non-uniform spreading head loading, and can disadvantageously influence a uniform spreading onto the forming belt.

SUMMARY OF THE INVENTION

It is therefore the underlying object of the invention, to provide a dosing hopper for producing wood material panels, from which hopper a uniform discharge quantity, especially of longitudinally extending or elongated flat wood strands (strands) is conveyed into the spreading head, over the entire hopper width.

This object is achieved by the invention in a dosing hopper with a feed device that includes a weighing device with which the strand material can be distributed in a weight-dosed manner over a width of the hopper.

The invention has the advantage, due to the weight-dosed material feed or introduction, that a uniform discharge quantity is always constantly made available for spreading over the entire hopper width, even with varying bulk densities, whereby a very uniform spreading is made possible, and an increase of the bending stiffness in the production of OSB panels can be achieved. Through the uniformalization of the spreading, the spreading fluctuation width is simultaneously reduced, so that already with a minimum of input of spreadable bulk material, the minimum requirements of prescribed quality characteristics can be maintained.

Through the weight-based crosswise distribution in the dosing hopper, a uniform material distribution over the entire hopper width is advantageously achievable already during the material supply or feeding, so that additional material turning or tilling devices such as back-striking or evening rakes and the like can be omitted. Thereby, a gentle material flow is simultaneously achieved in the hopper, whereby especially elongated flat wood strands (strands) are protected against damage, which serves for the quality improvement in connection with OSB panels.

In a particular manner of embodiment of the invention it is additionally provided to orient the elongated flat wood strands (strands) in crosswise or lengthwise direction before depositing them in the hopper. This has the advantage, that in the entire dosing hopper, a uniform density distribution and an increase of the supply quantity in the same supply space can be achieved. Thereby, an intermeshing or entangling of the elongated flat wood strands is simultaneously avoided, so that advantageously, break-up elements can be omitted at the discharge opening of the hopper.

In a further particular embodiment of the invention, it is provided to deposit the pre-oriented wood strands in a vertical hopper and to continuously draw off the wood strands through a vertical conveyor shaft or chute. Through the pre-orienting, a bridge formation in the hopper is advantageously avoided and a uniform material discharge is achieved.

An additional particular embodiment of the invention provides that a constriction-free horizontal filling path section is arranged as a continuation on the vertical conveyor shaft. Thereby, a loosening-up of the material structure is advantageously achieved on the horizontal conveying path section, so that a uniform weight-dosed discharge is made possible.

BRIEF DESCRIPTION OF THE DRAWINGS

The invention is described in further detail in connection with two example embodiments, which are shown in the drawings, wherein.

DETAILED DESCRIPTION OF EXAMPLE EMBODIMENTS OF THE INVENTION

Figure 1:
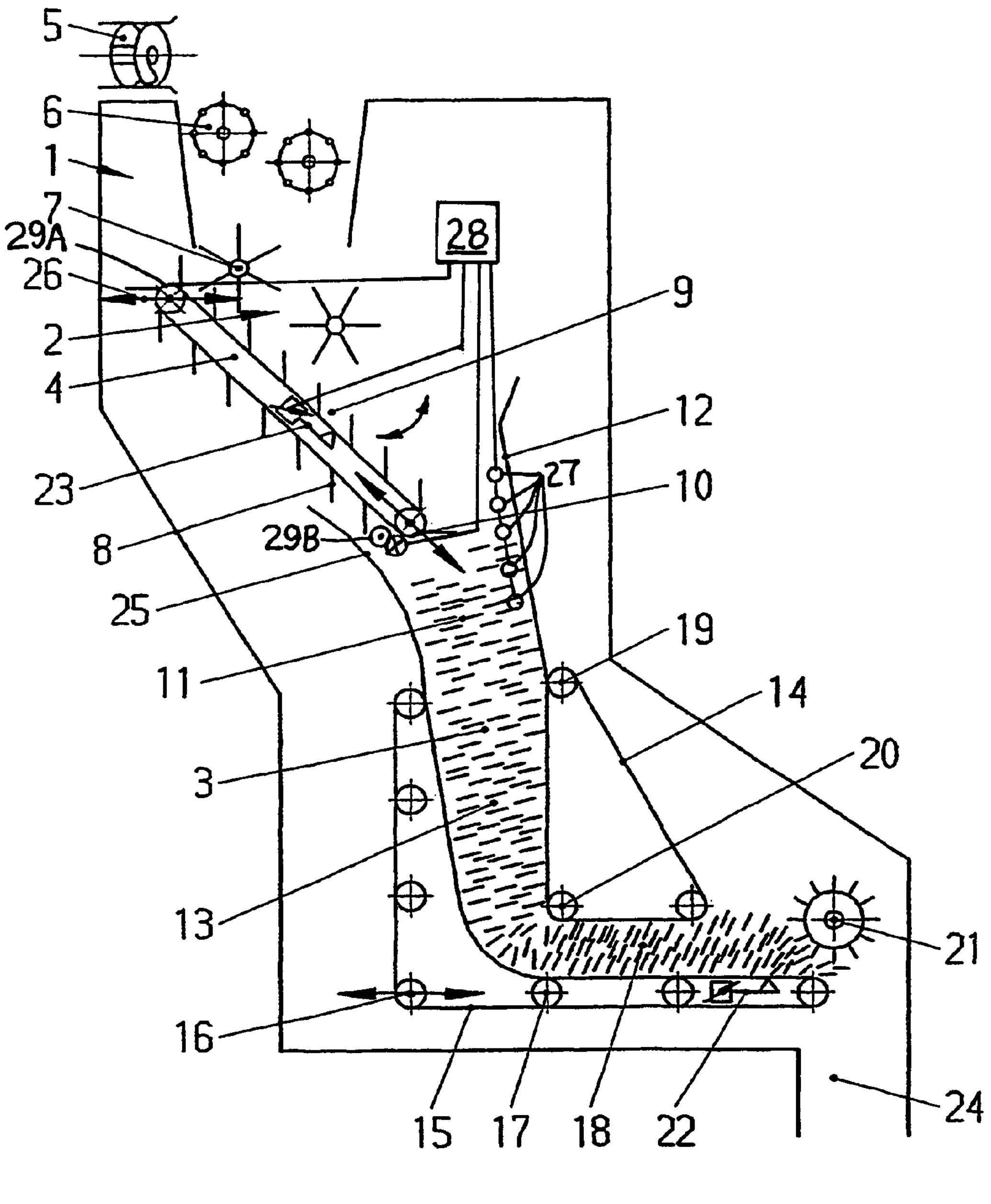
FIG. 1: shows a vertical dosing hopper with pre-oriented weight-dosed material feed.

In FIG. 1 of the drawing, a vertical hopper 1 for producing OSB or LSL panels is schematically illustrated, which essentially consists of a feed device 2 and a weight-detecting or acquiring oscillating conveyor 4 for the weight-dosed and oriented feeding of elongated wood strands (strands) into a vertical filling space or chamber 3 arranged thereunder.

In the production of OSB or LSL panels, glued elongated flat wood chips or strands (strands) with a length of 80 to 200 mm, a width of 10 to 40 mm, and a thickness of 0.4 to 1 mm are processed to form wood material panels. These wood strands are supplied via a helical screw conveyor 5 from a gluing mixer to the dosing hopper 1. The wood strands thereby come continuously out of the trough of the helical screw conveyor 5 in an unordered manner, and are to be spread onto a forming belt to form an oriented fleece, without damage to the extent possible. Namely, due to any damage being caused to the elongated wood strands, the bending strength of the resulting OSB or LSL panel would be impaired or the increased proportion of fines arising due to such strand damage would have to be additionally separated. For this reason, the invention suggests a dosing hopper 1 with a weight-dosed feed, so that, to the extent possible, the elongated wood strands do not need to be additionally tilled or rolled over once again in the dosing hopper 1, and therefore are easily separable and uniformly dischargeable. Therefore, the elongated wood strands are deposited out of the trough of a helical screw conveyor 5 above the dosing hopper 1, first onto two or more breakup rolls 6, which are to separate or breakup any possible occurring clumps or entanglements. For this purpose, preferably coarse-meshed cage rolls or spike rolls with few elastic spikes are provided, through which the loose wood strands can fall through nearly without any braking or slowing down, and free of damage.

At least two orienting rolls 7 are provided below the break-up rolls 6. The elongated wood strands glide into the slits of the orienting rolls 7 perpendicularly to the conveying direction. In this context, the orienting rolls 7 consist of a continuous through-going drive shaft, around which crosswise plates are provided and arranged in a star-like manner. Thereby, the spacing distances between the crosswise plates represent tapering slits, which are only so wide that the strands can glide thereinto only in a crosswise orientation. The orienting rolls 7 could, however, also be arranged in the conveying direction, so that the elongated wood strands would be oriented lengthwise. For the lengthwise orientation, however, disk rolls are also utilizable, through the slits of which the elongated wood strands would be directed in the lengthwise direction.

An oscillating conveyor belt 4 is arranged as an oscillating conveyor below the orienting rolls 7. The pre-oriented wood strands are deposited from the orienting rolls 7 onto the oscillating conveyor belt 4. Thereby, the conveyor belt is provided with crosswise webs 8 or crosswise plates, which form conveyor pockets 9 between the individual webs 8. Thereby, the spacing distances of the crosswise webs 8 or crosswise plates are dimensioned so that the wood strands can only be laid into the conveyor pockets 9 in their crosswise orientation, so that the crosswise orientation is maintained on the oscillating conveyor belt 4. With a lengthwise orientation, the conveyor belt could, however, also be provided with lengthwise webs, which take up the wood strands only in the lengthwise direction.

On its feed or take-up area, the oscillating conveyor belt 4 is supported in a manner so as to be signable i.e. Pivot able, or oscillatable crosswise and horizontally, and the oscillating conveyor belt 4 is tilted downward at an angle relative to the horizontal in the conveying direction. Thereby, the output or discharge end of the oscillating conveyor belt 4 is arranged to extend or plunge into the vertical filling space 3. The oscillating conveyor belt 4 is connected with a known oscillating or swinging drive, which is not shown, and which continuously swings or oscillates the relatively narrow conveyor belt 4 of maximally 1 m width back and forth over the entire hopper width. Thereby the elongated wood strands are deposited or laid down layer-wise over the entire hopper width. In this context, the hopper width corresponds approximately to the spreading width, which generally amounts to 2 to 4 m. A parallel conveyor could, however, also be provided as an oscillating conveyor, which is pushed slidingly back and forth over the hopper width, continuously and parallel to the forming belt direction.

For the continuous crosswise distribution of the wood strands in the vertical filling space 3, a belt weighing scale 23 is provided in the oscillating conveyor belt 4, and the conveying rate of the conveyed wood strands is determined by the belt weighing scale 23. Thereby, the crosswise oriented wood strands are layable or depositable in a weight-dosed manner over the entire width of the dosing hopper 1 or the vertical filling space 3. In this context it is provided to lay down or deposit always the same weight quantity of wood strands over the entire hopper width, so that the vertical filling space 3 is uniformly filled. Therefore, a constant conveying rate is prescribed, in connection with which, by a deviation from the rated or nominal weight, the belt speed is readjustable or regulatable in a following manner, whereby the swinging or oscillating speed remains constant. A prescribed conveying rate could, however, also be regulated by the swinging or oscillating speed. Since the oscillating conveyor belt 4 is sloped or inclined downwardly in the conveying direction, the downward inclination or slope of the conveyor belt 4 is detected by an inclination sensor or taken into account in a computerized manner with a constant inclination angle, in connection with the weight-dosed discharge. For this purpose, an evaluating device 28 is provided, by means of which both the belt loading as well as the belt speed is detected or acquired. In the event of a deviation from the prescribed conveying rate or from the rated or nominal weight, the belt speed of the conveyor belt 4 (established by the belt transport drive indicated schematically at 29A) or the oscillating speed (established by the belt lateral displacement drive indicated schematically at 29B) is correspondingly readjusted or regulated in a following manner.

While laying down or depositing the crosswise or lengthwise oriented wood strands in the vertical filling space 3, in order that the orientation is not lost, the spacing between the discharge location of the conveyor belt 4 from the depositing location in the vertical filling space 3 should not exceed a certain height spacing distance. For this reason it is provided that the oscillating conveyor belt 4 is adjustable in the conveying direction 10 so that it can reach or plunge more or less deeply into the vertical filling space 3. This can be carried out in a simple manner with a stroke or lift cylinder or a spindle drive. For this purpose, additional fill level sensors 27 are provided, which maintain a constant spacing distance from the wood strand surface in the vertical filling space 3 by means of the program controlled evaluating device 28.

In its filling area, the vertical filling space 3 consists of an upper filling shaft or chute 11, which consists of approximately parallel arranged rigid sidewalls 12, 25, which extend crosswise over the entire hopper width. These are secured at the end face on the hopper outer wall and form a rigidly surrounded or enclosed filling space of the filling shaft 11. A vertical conveying shaft or chute 13 is arranged below this upper filling shaft 11. The conveying shaft 13 essentially consists of two vertically arranged discharge conveyor belts 14, 15, which undergo a horizontal deflection 16, 20 in their lower area or region. These belts 14, 15 extend over the entire hopper width, and, together with the end face side outer walls of the dosing hopper 1, form the enclosed conveying shaft 13, which continuously conveys the hopper contents to a discharge opening 24. The two discharge belts 14, 15 each respectively comprise an endless belt that is arranged respectively on three deflection rolls, for example such as the rolls 16, 19, 20, which are respectively arranged approximately like the end points of a right triangle for each one of the belts 14, 15. Thereby, the two conveyor belts 14, 15 respectively adjoin the bottom point of the side walls 12, 25 of the upper filling shaft 11, and thereby form its extension. Thereby, the two discharge belts 14, 15 are arranged so that they are provided with differing roll spacings. Thereby, the roll spacings are provided so that both a vertical conveying shaft 13 as well as a horizontal conveying shaft 18 are formed between the two conveyor belts 14, 15. In these deflected shafts 13, 18, the oriented wood strands are conveyed to the discharge opening 24.

In that context, the vertical conveying shaft 13 is embodied as a converging or squeezing or pinching path section, in that the shaft can be tapered downwardly on at least one inner side surface. This is achieved in that the lower discharge belt 15 lies only loosely on its support rolls 17, and the shaft width is adjustable with a horizontally adjustable tension roll 16. Due to the narrowing of the shaft width, the layers of the oriented wood strands are laterally squeezed in or pinched, so that these are carried along in the conveying direction by the motion of the discharge belts 14, 15. Thereby, it is simultaneously achieved that the individual layers in the lower region of the vertical conveying shaft 13 are not significantly compacted or compressed due to the filling height, so that an easily separatable bulk fill is maintained in the vertical shaft 13.

In the start-up operation, the vertical conveying shaft 13 is closeable in the deflection area with the aid of the tension roll 16, so far that both discharge belts 14, 15 lie lightly against or in contact on one another with their inner walls. This prevents the occurrence that the wood strands to be newly filled-in can slide through to the discharge opening 24. Simultaneously, the vertical shaft 13 is reduced in size so far that the discharge height is only so large that an oriented laying-down or depositing remains assured in the vertical conveying shaft 13. While filling in the wood strands, the fill height is detected by the fill level sensors 27, and is provided to the evaluating device 28. This controls the following guidance or motion of the oscillating conveyor belt 4 in the conveying direction 10, 50 that the spacing distance to the fill level plane remains the same so long until a prescribed filling height is achieved. As soon as the converging, squeezing or pinching path section 13 is filled to the intended height, the belt tension can be loosened by the adjustable tension roll 16, so much that a continuous discharge is made possible. For this purpose, the lower shaft width can be enlarged so far that it corresponds to the shaft width of the upper filling shaft 11. In that context, the material conveying rate that is to be filled-in is increased so much until an intended total filling height is reached in the vertical filling space 3. Then, through a prescribed discharge quantity, a certain feed conveying rate is determined, which distributes the wood strands over the entire hopper width in a weight-wise uniform manner and simultaneously keeps the filling height constant. The fill level sensors 27 can be distributed on the end face side of the hopper so that they also detect the fill level height perpendicularly to the hopper width. For this purpose, the oscillating conveyor belt 4 can also be arranged to be slidably displaceable horizontally and perpendicularly relative to the hopper width (as indicated at 26), so that a constant filling height is also achievable perpendicularly to the hopper width.

In the lower region of the converging, squeezing or pinching path section 13 or of the vertical conveying shaft 13, a deflection of the vertical discharge flow into a horizontal discharge flow takes place through the lower tension roll 16 of the lower discharge belt 15 and the upper tension roll 20 of the upper discharge belt 14. Thereby, a sliding-through of the vertical material flow out to the discharge opening during the discharge operation is advantageously prevented. Simultaneously, a loosening of the compaction or compression effect is also achieved, so that a gentle protective uniform discharge into the spreading head is made possible. The vertical filling space 3 could, however, also be formed by one or two parallel oppositely arranged conveyor belts, that are directed toward two horizontal conveyor belts, which then form the horizontal filling shaft. A bucket wheel sluice or chute could, however, also be provided below the vertical filling space 13, by means of which the oriented wood strands are discharged into the spreading head according to the manner of the orienting rolls.

The horizontal discharge flow in the horizontal conveying shaft 18 in this regard represents a squeeze-free or pinch-free filling path section, which forms a horizontal supply reserve. This horizontal filling path section 18 predominantly serves for bringing about a uniform discharge behavior. This is predominantly achieved in that a loosening of a vertical layering is carried out by the deflection, so that a uniformly dischargeable material flow becomes adjusted or formed in the horizontal shaft 18.

The two discharge belts 14, 15 are regulatable in their belt speed. In this context, the belt speed of both discharge belts is regulated so that they ensure a constant-remaining discharge speed in the shafts 13, 18, so that the pre-orientation is not changed, and so that a material turning-over or tilling does not arise in the shafts 13, 18, to the extent possible. Preferably, a belt weighing scale 22 is still further provided at the belt end of the horizontal conveying shaft 18, by means of which belt weighing scale 22 the discharge quantity is regulatable via the discharge belt speed. Additionally, still further, a striking or strike-off roll 21 is provided at the belt end of the horizontal conveying shaft 18, which striking roll 21 combs off the oriented wood strands in a gentle protective manner into the discharge opening 24 to the spreading chamber. Thereby, the vertical hopper 1 ensures a gentle protective supplying or feeding and uniform weight-dosed discharge of the elongated wood strands, so that these can develop their maximum strength in the OSB panels that are to be spread-out, and are not impaired by the arising proportion of fines. The feed device 2 arranged in the vertical hopper 1 could, however, also be provided in a separate device component above the hopper housing, if this is possible and advantageously achievable for structural reasons.

Figure 2:
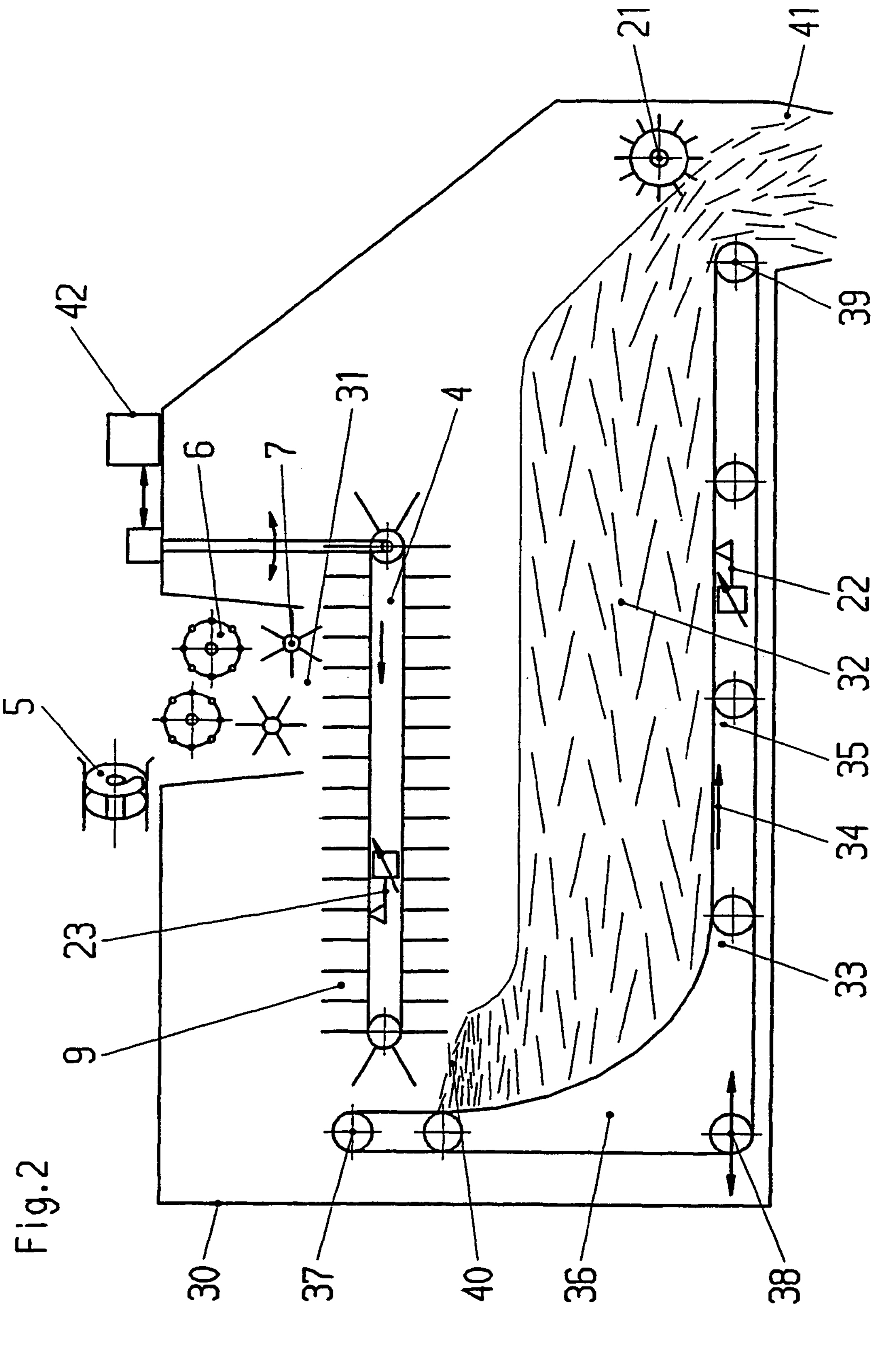
FIG. 2: shows a horizontal dosing hopper with pre-oriented weight-dosed material feed.

A horizontal hopper 30 with a weight-dosed feed device 31 is schematically illustrated in FIG. 2 of the drawing. The horizontal hopper 30 essentially consists of a horizontal filling path section 32, which is formed from a floor belt 33, and of the feed device. A helical screw conveyor 5 is arranged above the feed device 31, and brings up or supplies the glued elongated wood strands (strands) from a gluing mixer. This helical screw conveyor 5 corresponds to the helical screw conveyor according to FIG. 1 of the drawing, whereby the same reference numbers have also been used for the similar components in FIG. 2 of the drawing. The feed device 31 essentially consists of the orienting rolls 7 and an oscillating conveyor 4. Thereby, the elongated wood strands, for producing OSB panels, are first deposited onto at least two break-up rolls 6 and the orienting rolls 7 arranged thereunder. The oscillating conveyor 4, which is formed of a conveyor belt provided with pockets 9, is arranged below the orienting rolls 7. The horizontal hopper 30 extends across the entire width of the spreading head, which can amount to up to 4 m. The oscillating conveyor 4, in comparison, has only a width of maximally 1 m, and is continuously oscillated or pivoted horizontally back and forth over the entire width of the dosing hopper 30, and thereby distributes the supplied wood strands uniformly over the width of the hopper 30. In this context, the oscillating speed is a multiple of the discharge speed, so that the oriented wood strands are laid down or deposited layer-wise on top of one another. The oscillating conveyor 4 is arranged horizontally over the filling path section 32 and conveys the oriented wood chips to the filling section opposite to the discharge direction 34. The oscillating conveyor 4 can also be sloped or inclined relative to the horizontal, so that the oriented wood strands can be laid down or deposited in an oriented manner in the bottom area or region of the filling path section 32 during the start-up operation. For that purpose, fill level sensors (not shown), which detect the fill height on the side surfaces perpendicular to the hopper width, are provided. In a program or processor controlled evaluating device (not shown), the slope or inclination of the oscillating conveyor 4 can be readjusted or regulated in a following manner by means of the fill level sensors and a prescribed spacing distance to the fill height. In this context, the oscillating conveyor 4 is only followingly readjusted or regulated so far until a prescribed fill level height is reached in the hopper 30. After reaching this prescribed nominal or rated fill level height, the floor belt 33 can be controlled so that the fill layer is conveyed to the discharge opening 41. However, the oscillating conveyor 4 in this context can also be arranged so that it is supported to be adjustable in the conveying direction 34. Thereby, with the aid of fill level sensors arranged in the conveying direction, a constant filling height in the conveying direction 34 could already be adjustably settable by the lengthwise adjusting of the conveyor, and possible refilling interruptions could be filled up.

A belt weighing scale 23, which detects the weight quantity of the conveyed wood strands, is provided near the discharge end in the oscillating conveyor belt 4. In this context, with a constant oscillating speed, the belt speed is regulated so that the wood strands are distributed with an always constant conveying rate over the width of the dosing hopper 30, so that, with a prescribable discharge quantity, a uniform filling quantity on the filling path section 32 is achieved over the entire floor belt width. For regulating the conveying rate in this context, a program or processor controlled evaluating device (not shown) is provided, as they are used in known dosing belt weighing scales.

The floor belt 33 essentially consists of an elongated horizontal part 35 and a shortened vertical part 36, that are formed by three deflection rolls 37, 38, 39 arranged like a triangle. The floor belt 33 is tensionable to a variable degree by the lower horizontally adjustable tension and deflection roll 38. Thereby, the belt can be shortened to such a degree in the start-up operation, so that the loosely contacting discharge belt 33 in the depositing region 40 of the wood strands is inclined or positioned to a slope angle so far so that the wood strands are depositable in a substantially oriented manner onto the discharge belt 33 in the depositing region 40. Thereby, an ordered depositing possibility arises in the horizontal hopper 30 already during the start-up operation, so that a uniform filling height with oriented wood chips builds up, which is then conveyed by means of a prescribed discharge speed to the discharge opening 41.

A belt weighing scale 22 can also be provided at the discharge end in the floor belt 33, with the aid of which a provided discharge quantity is regulatable by the belt speed of the floor belt. Thereby, through the weight-dosed feeding of the elongated wood strands, a uniform discharge into the spreading head is possible over the entire hopper width, without an additional volume oriented crosswise distribution in the dosing hopper 30 being necessary.

The invention claimed is:

1. A dosing hopper arrangement for supplying material strands for an apparatus for producing a structural panel from the material strands, said dosing hopper arrangement comprising:

a hopper through which the material strands are to be fed, wherein said hopper has a hopper width in a width direction; and a feed arrangement adapted and arranged to feed the material strands into said hopper;

wherein said feed arrangement comprises a dosing belt weighing scale, which comprises a feed conveyor belt arranged and adapted to convey the material strands in a conveying direction and a conveyor weighing device arranged and adapted to weigh the material strands on said feed conveyor belt; and wherein said feed conveyor belt has a belt width less than said hopper width in said width direction, and is pivotably or slidably displaceable horizontally in said width direction so as to be thereby adapted to distribute the material strands from the feed conveyor belt over said hopper width.

2. The dosing hopper arrangement according to claim 1, wherein said feed conveyor belt is pivotably displaceable horizontally in said width direction over said hopper width.

3. The dosing hopper arrangement according to claim 1, wherein said feed conveyor belt is slidably displaceable horizontally in said width direction over said hopper width.

4. The dosing hopper arrangement according to claim 1, wherein said feed conveyor belt is further displaceable horizontally in a direction perpendicular to said width direction.

5. The dosing hopper arrangement according to claim 1, further comprising at least one further conveyor belt arranged gravitationally below a discharge end of said feed conveyor belt, adapted to feed the material strands from said feed conveyor belt to said further conveyor belt, wherein said further conveyor belt has a width in said width direction greater than said belt width of said feed conveyor belt and extending over said hopper width.

6. The dosing hopper arrangement according to claim 1, further comprising a belt transport drive arranged and adapted to transport said feed conveyor belt so as to feed the material strands on said feed conveyor belt, a belt lateral displacement drive arranged and adapted to pivotally or slidingly displace said feed conveyor belt in said width direction, and an evaluating device connected to said conveyor weighing device, said belt transport drive and said belt lateral displacement drive, wherein said evaluating device is adapted to determine an actual conveying rate of the material strands being fed on said feed conveyor belt, to compare said actual conveying rate with a prescribed conveying rate, and if said actual conveying rate deviates from said prescribed conveying rate, to regulate a respective speed of at least one of said belt transport drive or said belt lateral displacement drive so as to achieve a constant weight-based material quantity feed of the material strands into said hopper over said hopper width.

7. The dosing hopper arrangement according to claim 1, wherein said feed conveyor belt comprises a base belt and lengthwise or crosswise pockets provided on said base belt, wherein said pockets are adapted to receive therein the material strands oriented lengthwise or crosswise relative to said conveying direction.

8. The dosing hopper arrangement according to claim 1, wherein said feed arrangement further comprises orienting rolls or disc rolls that are arranged gravitationally above said feed conveyor belt and that are adapted to pre-orient the material strands as the material strands pass through said orienting rolls or said disc rolls onto said feed conveyor belt.

9. The dosing hopper arrangement according to claim 1, wherein said feed conveyor belt of said dosing belt weighing scale slopes downwardly in said conveying direction which extends transverse to said width direction, and is adjustable with respect to at least one of a slope angle of said feed conveyor belt or a forward extension in said conveying direction of said feed conveyor belt.

10. The dosing hopper arrangement according to claim 1, wherein said dosing hopper arrangement further comprises a hopper housing, and said feed arrangement is arranged partly or entirely in or above said hopper housing.

11. The dosing hopper arrangement according to claim 1, wherein said hopper includes at least a horizontal hopper section arranged gravitationally below and flow downstream of said feed conveyor belt, with a discharge weighing scale arranged in said horizontal hopper section so as to be adapted to weigh a discharge quantity of the material strands in said horizontal hopper section.

12. The dosing hopper arrangement according to claim 1, further comprising fill level sensors arranged in said hopper and adapted to detect a fill level of the material strands in said hopper.

13. The dosing hopper arrangement according to claim 12, wherein a downstream discharge end of said feed conveyor belt has an adjustable height relative to said hopper, and further comprising an evaluating device connected to said fill level sensors and adapted to regulate said adjustable height of said downstream discharge end of said feed conveyor belt with respect to the fill level of the material strands in said hopper.

14. The dosing hopper arrangement according to claim 13, wherein said evaluating device is further connected to said conveyor weighing device and is adapted to determine and regulate a feed conveying rate of the material strands based on the fill level of the material strands in said hopper and a weight of the material strands on said feed conveyor belt.

15. The dosing hopper arrangement according to claim 1, wherein said hopper comprises a vertical hopper that includes a vertical filling space arranged gravitationally below a downstream discharge end of said feed conveyor belt.

16. The dosing hopper arrangement according to claim 15, wherein said vertical hopper comprises a rigid vertical filling shaft defining therein at least an upper portion of said vertical filling space.

17. The dosing hopper arrangement according to claim 15, wherein said vertical hopper comprises a vertical conveyor arrangement including a first conveyor belt that has a width extending over said hopper width in said width direction, and that extends vertically or sloping downward, and that bounds at least a lower portion of said vertical filling space.

18. The dosing hopper arrangement according to claim 17, wherein said vertical conveyor arrangement further comprises a second conveyor belt that has a width extending over said hopper width in said width direction and that is arranged spaced apart from said first conveyor belt horizontally so as to define at least said lower portion of said vertical filling space therebetween.

19. The dosing hopper arrangement according to claim 18, wherein said first and second conveyor belts become closer to one another in a downward direction so that said vertical filling space tapers through a narrowed section.

20. The dosing hopper arrangement according to claim 18, wherein said vertical hopper further includes a horizontal conveying space communicating further from a discharge end of said vertical filling space, said first and second conveyor belts are each deflected so that respective horizontal portions of said first and second conveyor belts are vertically spaced apart from one another so as to define said horizontal conveying space therebetween.

21. The dosing hopper arrangement according to claim 20, wherein said vertical hopper further includes three first conveyor belt deflection rolls on which said first conveyor belt is supported and deflected and which are arranged in a first triangular pattern, and three second conveyor belt deflection rolls on which said second conveyor belt is supported and deflected and which are arranged in a second triangular pattern.

22. The dosing hopper arrangement according to claim 21, wherein said horizontal portion of said first conveyor belt is gravitationally below said horizontal portion of said second conveyor belt, and at least one of said first conveyor belt deflection rolls is an adjustable deflection roll with which a belt tension of said first conveyor belt and a tapering of a space between said first and second conveyor belts can be adjusted.

23. The dosing hopper arrangement according to claim 15, wherein said vertical hopper further includes a horizontal conveying shaft or a bucket wheel sluice arranged at a bottom downstream end of said vertical filling space.

24. The dosing hopper arrangement according to claim 23, wherein said vertical hopper comprises at least one discharge conveyor belt that has a width extending over said hopper width in said width direction and that includes at least a belt portion extending horizontally to bound said horizontal conveying shaft thereon.

25. The dosing hopper arrangement according to claim 1, wherein said hopper comprises a horizontal hopper that includes a horizontal filling space bounded on a bottom thereof by a floor conveyor belt and arranged gravitationally below a downstream discharge end of said feed conveyor belt.

26. The dosing hopper arrangement according to claim 25, wherein said horizontal hopper further includes three deflection rolls arranged in a triangle pattern, and wherein said floor conveyor belt includes a horizontal part and a vertical part supported and deflected on said deflection rolls.

27. The dosing hopper arrangement according to claim 26, wherein at least one of said deflection rolls is arranged to have an adjustable position, by which a belt tension of said floor conveyor belt can be adjusted.

* * * * *

UNITED STATES PATENT AND TRADEMARK OFFICE
CERTIFICATE OF CORRECTION

PATENT NO. : 7,278,551 B2
APPLICATION NO. : 10/399352
DATED : October 9, 2007
INVENTOR(S) : Graf et al.

It is certified that error appears in the above-identified patent and that said Letters Patent is hereby corrected as shown below:

Column 3,
Line 47, after “or”, replace “breakup” by --break-up--;

Column 4,
Line 16, after “be”, replace “signable” by --swingable--;
after “i.e.”, replace “Pivot able” by --pivotable--;

Column 6,
Line 4, after “10,”, replace “50” by --so--.

Signed and Sealed this

Thirty-first Day of March, 2009

JOHN DOLL
*Acting Director of the United States Patent and Trademark Office*